Oct. 22, 1929.  W. STANIEWICZ  1,733,032
DRIVING MECHANISM FOR MOTOR VEHICLES
Filed March 1, 1929
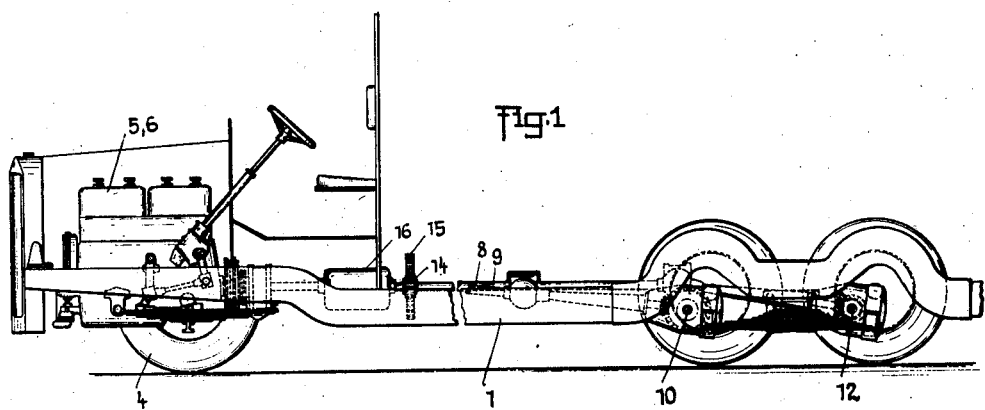
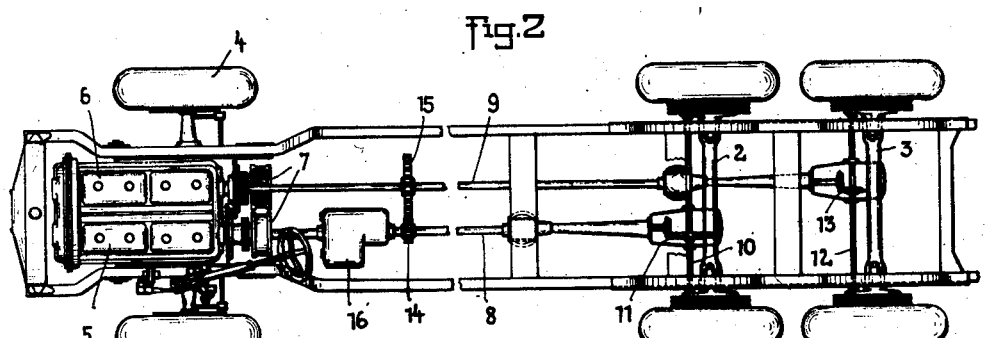
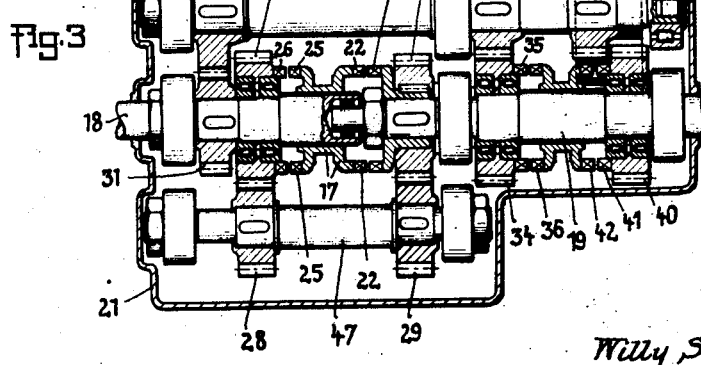
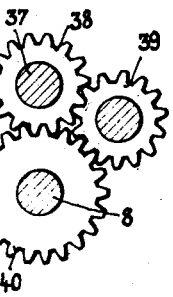
Inventor,
Willy Staniewicz,
by
Attorney.

Patented Oct. 22, 1929

1,733,032

UNITED STATES PATENT OFFICE

WILLY STANIEWICZ, OF BRUNSWICK, GERMANY, ASSIGNOR TO AUTOMOBILWERKE H. BÜSSING, AKTIENGESELLSCHAFT, OF BRUNSWICK, GERMANY

DRIVING MECHANISM FOR MOTOR VEHICLES

Application filed March 1, 1929, Serial No. 343,799, and in Germany November 5, 1927.

My invention relates to improvements in driving mechanisms for motor vehicles, and more particularly in driving mechanisms of the type comprising two motors of different power having their crank shafts coupled with driving shafts each connected respectively with one of the axles of the vehicle, the said driving shafts being connected by suitable gear wheels, so that the axles can be driven by either one of the motors or by both motors. The object of the improvements is to provide a driving mechanism of this type in which the dimensions of the motors of different power are substantially alike, and with this object in view my invention consists in providing motors of similar dimensions and adapted to be operated at different velocities, the said driven shafts being connected by a gearing the gear ratio of which corresponds to the ratio of the velocities of the motors, so that the velocity of the axles is alike.

For the purpose of explaining the invention an example embodying the same has been shown in the accompanying drawing in which the same reference characters have been used in all the views to indicate corresponding parts. In said drawing, Fig. 1, is an elevation showing a motor vehicle having a front axle and two rear axles, the said rear axles being connected with the driving shafts, Fig. 2, is a top plan view of Fig. 1 with some parts shown in section, Fig. 3, is a sectional plan view showing the change speed and reversing gearing, and Fig. 4, is an elevation showing the gear wheels for reverse drive.

In the example shown in the figures the frame 1 of the vehicle is supported on two rear axles 2 and 3 and front wheels 4. On the frame two motors 5 and 6 are mounted which as shown have substantially the same dimension, and which are constructed for being operated at different velocities, the velocity of the motor 6 being smaller than that of the motor 5. The motors 5 and 6 are connected by clutches 7 with driving shafts 8 and 9, the shaft 8 being connected by a differential shaft 10 and bevel gear wheels 11 with the shaft wheels mounted on the axle 2, and the shaft 9 being connected by a differential shaft 12 and bevel gear wheels 13 with the wheels mounted on the axle 3. The driving shafts 8 and 9 are connected by spur gears 14 and 15 of different diameters, the diameter of the gear wheel 15 mounted on the shaft 9 being larger than the diameter of the gear wheel 14 mounted on the driving shaft 8, and the gear ratio of the gear wheels 14 and 15 corresponding to the ratio of the velocities of the motors 5 and 6. Therefore, the driving shafts 8 and 9 are capable of cooperation notwithstanding the difference of the velocities of the motors 5 and 6. In order that the velocities of the wheels mounted on the axles 2 and 3 be alike, the gear ratios of the bevel gear wheels 11 and 13 are different, the driven wheel of the gearing 13 being smaller in diameter than the driven gear wheel of the gearing 11.

Preferably, the driving shaft 8 includes a change speed and reversing gearing 16. The clutches 7, 7 are provided with separate operating mechanisms, so that either one of them or both may be thrown into coupling position.

In the example shown in Figs. 3 and 4 the change speed and reversing gearing comprises a housing 21. The driving shaft consists of two sections 8 and 18 disposed in axial alignment. On the shaft section 18 a coupling sleeve 17 is axially slidable, which comprises two clutch members 22 and 25, and it has a change wheel 31 keyed thereto. Further, on the said shaft a change wheel 27 is rotatable which is provided with a clutch member 26 cooperating with the clutch member 25 of the sleeve 17. The shaft section 8 is provided with a clutch member 23 cooperating with the clutch member 22 of the shaft section 18 for transmitting direct drive to the shaft section 8. To the hub of the clutch member 23 a gear wheel 30 is secured. On the shaft section 8 a coupling sleeve 19 is axially shiftable, which is provided with clutch members 36 and 42, and on the shaft section 8 gear wheels 34 and 40 are rotatable which are provided with clutch members 35 and 41 cooperating respectively with the clutch members 36 and 42 of the coupling sleeve 19. At opposite sides of the shaft 8, 18 intermediate shafts 37 and 47 are rotatably mounted, and the shaft 37 has change wheels 32, 33 and 38 keyed thereto, the change wheel 32 meshing with the gear wheel 31, the change wheel 33 meshing with the gear wheel 34, and the reversing gear wheel 38 with an idle wheel 39 which is in mesh with the gear wheel 40.

In the operation of the driving mechanism both motors may be operated and connected with their respective shafts 8 and 9, in which case full power is transmitted to the axles 2 and 3. Further, either one of the motors may be thrown out of operation, so that only one of the motors is coupled with the shafts 8 and 9. Thus, if the power required for driving the vehicle is high, both motors are thrown into operation, if the power is comparatively small, only the motor 5 is thrown into operation, and if the power is further reduced, only the motor 6 is thrown into operation.

Further, when throwing only the motor 5 into operation the change speed gearing may be operated. The direct drive is transmitted through the clutch members 22, 23 to the shaft 8, the second forward drive is transmitted from shaft section 18 to the clutch members 25, 26 and the gear wheels 27, 28, 29, 30, the third drive is transmitted from shaft section 18 through the gear wheels 31, 32, the shaft 37, the gear wheels 33, 34, and the clutch members 35, 36, and the reverse drive is transmitted to the shaft 8 through the gear wheels 31, 32, the shaft 37, the gear wheels 38, 39, 40, and the clutch members 41, 42.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. A driving mechanism for motor vehicles, comprising two motors operating normally at different velocities, driving shafts one for each of said motors, means for selectively coupling said driving shafts and motors, driven axles connected with said driving shafts, and a gearing connecting said driving shafts and having a gear ratio corresponding to the ratio of the velocities of said motors.

2. A driving mechanism for motor vehicles, comprising two motors operating normally at different velocities, driving shafts one for each of said motors, means for selectively coupling said driving shafts and motors, driven axles connected with said driving shafts, a gearing connecting said driving shafts and having a gear ratio corresponding to the ratio of the velocities of said motors, and gears intermediate said driving shafts and axles corresponding to the ratio of the velocities of said motors, whereby both axles are driven at approximately the same speed.

In testimony whereof I have affixed my signature.

WILLY STANIEWICZ.